United States Patent Office 3,255,173
Patented June 7, 1966

3,255,173
FIBER REACTIVE MONOAZO AND DISAZO DYES WITH AN INDOLE COUPLING COMPONENT
Johannes Dehnert, Dieter Leuchs, Gerhard Luetzel, and Werner Rohland, Ludwigshafen (Rhine), Germany, assignors to Badische Anilin- & Soda-Fabrik Aktiengesellschaft, Ludwigshafen (Rhine), Germany
No Drawing. Filed June 17, 1963, Ser. No. 288,521
Claims priority, application Germany, June 22, 1962, B 67,761
6 Claims. (Cl. 260—153)

The present invention relates to water-soluble azo dyes which contain the radical of an indole coupling component and which also contain a grouping by means of which they can be fixed on cellulosic textile materials either directly or with the coemployment of a polyfunctional reactive compound under the conventional conditions for dyeing with reactive dyes.

Many azo dyes are already known having reactive groups or groups which react with cellulose fibers by means of polyfunctional reactive compounds. Although these prior art dyes usually have good general fastness they have the disadvantage of a low fastness to hypochlorite bleaching. Since in many countries, particularly in countries having a a hot climate, textile materials are frequently treated with liquors containing hypochlorite for hygienic reasons, dyeings which have been obtained with dyes having inadequate fastness to bleaching with hypochlorite soon bleach out.

It is the object of the present invention to provide dyes which do not have the said disadvantage and which are distinguished by good fastness to hypochlorite bleaching while retaining good general tinctorial properties.

This object is achieved by dyes having the general formula:

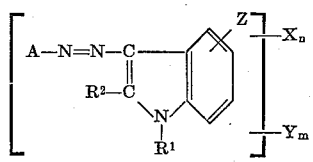

in which A denotes the radical of an aromatic-isocyclic or amomatic-heterocyclic diazo component, $R^1$ denotes an unsubstituted or substituted aliphatic, cycloaliphatic, araliphatic, aromatic or heterocyclic radical, $R^2$ denotes a hydrogen atom or an unsubsituted or substituted aliphatic, cycloaliphatic, araliphatic, aromatic or heterocyclic radical, X denotes a water-solubilizing group, Y denotes a reactive radical, i.e. a radical capable of reacting with the hydroxyl groups of cellulose, Z denotes a hydrogen atom or one of the substituents common in azo chemistry, $n$ denotes a small whole number, for example 1 to 5 and preferably 1 to 3, and $m$ denotes a small whole number, preferably zero to 2; when $m$ is zero, the dye contains at least one active hydrogen atom which reacts with a polyfunctional reactive compound under the conditions usual for dyeing with reactive dyes.

Among the said dyes, those have particular technical interest which have the general formula:

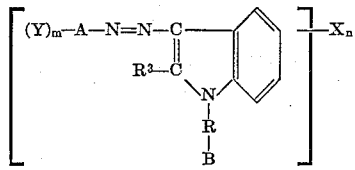

in which Y, A, X, $m$ and $n$ have the meanings given above, R denotes a low molecular weight alkylene radical, B denotes a radical Y or a hydrogen atom or amino, cyano, carboxyl or carbonamide group, $R^3$ denotes a phenyl radical or low molecular weight alkyl radical and, when there is no radical Y present in the molecule, the dye contains at least one active hydrogen atom, preferably attached to nitrogen.

We understand by low molecular weight groups for example groups having one to six carbon atoms and preferably one to four carbon atoms.

We understand by compounds having active hydrogen atoms those compounds which are capable of adding on to a double linkage after the manner of a Michael addition.

Dyes according to this invention are obtained when a diazo compound of an aromatic-isocyclic or aromatic-heterocyclic amine is coupled with an indole capable of coupling in 3-position which bears in 1-position and preferably also in 2-position an unsubstituted or substituted aliphatic, cycloaliphatic, araliphatic, aromatic or heterocyclic radical, the components being chosen so that the final dye contains at least one water-solubilizing group and at least one reactive radical or at least one group capable of uniting a reactive radical with the dye molecule.

The reactive radical may also be introduced into the dye after coupling, if desired in the dye liquor, in the printing paste or on the fiber, and the coupling of the diazo and coupling components may also be carried out on the fiber, the diazo component or the coupling component being if desired previously chemically combined with the fiber.

The reactive radical may be contained in the coupling component but is preferably in the diazo component, and if desired, it may be present more than once in the dye molecule. The connection of the reactive radical with the diazo component or coupling component or with the finished dye may be by direct linkage or via intermediate members of great variety containing carbon, sulfur, oxygen or/and nitrogen.

We understand by reactive radicals those which under dyeing conditions are capable of reacting with the functional groups of the fiber in question, preferably with hydroxyl groups, the principle of which is already known from the chemistry of reactive dyes. The groups may be present in reactive form; they may however also have a constitution which is not converted into reactive form until subjected to dyeing conditions or to a pretreatment or aftertreatment. Radicals of this type are for example those containing a group readily capable of being split off as an anion, such as a sulfuric acid half ester, a thiosulfuric acid half ester or a halogen atom, for example a chlorine atom or bromine atom, or containing a double or triple linkage which is readily capable of addition reactions of the so-called Michael addition type, or capable under the action of alkaline agents of forming a double linkage capable of addition reactions of the said type. The reactivity of the reactive radical with hydroxyl groups may for example be due to a three-membered ring readily capable of addition, as for example an epoxide ring or ethylenimine ring. These rings may also be formed under the action of acid-binding agents before, during or after the dye has been applied to the material to be dyed. Precursors of this type may for example contain radicals such as

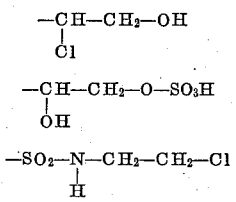

and

—SO₂—NH—CH₂—CH₂—O—SO₃H

The radicals having the following formulae may also be the reactive radicals:

—CO—CH₂—Cl
—CO—CH₂—Br
—CO—CH₂—CH₂—Cl
—CO—CH—CH₂—Cl
     |
    Cl
—CO—CH₂—CH₂—Br

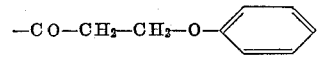

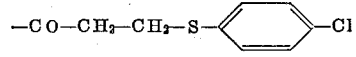

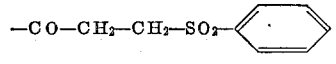

—CO₂—CH₂—CH₂—O—SO₃H

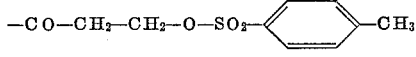

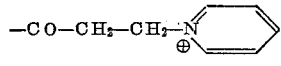

—SO₂—CH₂—CH₂—Cl
—SO₂—CH₂—CH₂—O—SO₃H
—SO₂—CH₂—CH₂—O—SO₂—CH₃

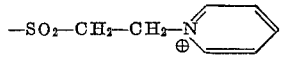

—CO—CH=CH₂
—CO—C=CH₂
    |
   CH₃
—CO—CH=CH—CH₃
—CO—C≡CH
—CO—C=CH
    |
   Cl
—CO—C=CH
    |
   Br
—CO—CH=CH—Cl
—CO—C=C—H
    |  |
   Cl Cl
—CO—C=C—Cl
    |  |
   Cl Cl
—CO—CH=CCl—COOH
—CO—CH=CH—Br
—CO—CCl=CCl—COOH
—CO—CHCl—CHCl—COOH
—CO—CHBr—CHBr—COOH
—SO₂—CH=CH₂
—CO—CH=CH—CH₂—Cl

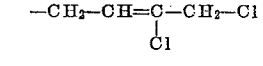

—CH₂—CH=C—CH₂—Cl
       |
      Cl
—CH₂—C≡C—CH₂—Cl
—CH₂—CH₂—O—SO₃H
—CH₂—CH₂—S—SO₃H
—CH₂—CH₂—NH—CH₂—CH₂—O—SO₃H
—CH₂—CH₂—N—(CH₂—CH₂—O—SO₃H)₂

—CH₂—CH—CH₂—N—(CH₂—CH₂—O—SO₃H)₂
    |
   O—SO₃H

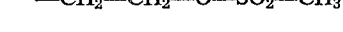

—CH₂—CH₂—O—SO₂—CH₃

—CH=CH₂

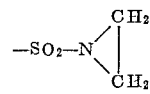

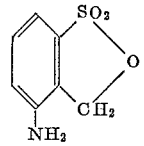

—SO₂—F

—N=C=O

O
     ‖
—N—C—O—SO₂Na
 |
 H

Further radicals capable of reaction with hydroxyl groups include for example heterocyclic six-membered rings containing two or three nitrogen atoms as hetero atoms and bearing radicals capable of being split off in the form of ions. These radicals may be contained in the heterocycle for example once, twice or three times. Examples of such radicals which are capable of reacting with hydroxyl groups under dyeing conditions are radicals of derivatives of cyanuric chloride which contain one or two chlorine atoms. An amino, aryloxy, mercapto or aryl radical may for example also take the place of a chlorine atom. These radicals replacing a chlorine atom may be substituted, for example by sulfonic acid groups. The reactive chlorine atoms may also be replaced for example by thiocyano 2-chloroethylamino or ethylenimino groups which like the chlorine atom cause reactivity with the fiber. Tetrameric cyanogen chloride, halopyrimidines, haloquinazolines, haloquinoxalines, halobenzothiazoles, halopyridazines, halopyridazones, halotriazines and their derivatives may also serve as reactive heterocycles instead of cyanuric chloride. The reactive radicals specified on pages 4 to 6 of Belgian Patent Specification No. 590,519 are also suitable. Groups capable of reaction with cellulose fibers under acid conditions, such as N-methylol and N-methylene ether groups, are also suitable.

Introduction of the reactive radical into the final dye is preferably effected in aqueous medium at a pH value between 3 and 9 at temperatures between 0° and 100° C., depending on the reactivity of the components used, by the methods known from the literature.

Dyes having at least one active hydrogen atom are dyes having groups capable of uniting a reactive radical with the dye molecule, for example acylatable groups, such as primary or secondary aromatic or aliphatic amino groups, hydroxyl groups, sulfamide groups or heterocyclic imino groups.

The dyes according to this invention which contain such groups capable of uniting a reactive radical with the dye molecule are preferably dyed or printed in the presence of polyfunctional colorless compounds which in alkaline or acid medium are capable of fixing the dye fast to the fiber. Examples of colorless polyfunctional compounds which react under alkaline conditions are polyepoxides, such as butadiene dioxide, cyanuric chloride and its derivatives, hexahydro-1,3,5-triacryloyl-s-triazine and its reaction products with secondary amines.

Examples of polyfunctional colorless compounds which are capable of fixing the dye on cellulosic fibers under acid conditions are curable aminoplast-forming substances or/and their precursors together with aldehydes or compounds which split off formaldehyde, for example those which contain in the molecule at least once the group having the formula:

$$-\underset{\underset{X}{\|}}{C}-\underset{\underset{R^4}{|}}{N}-CH_2OR'$$

in which X denotes O, S, NH or N, $R^4$ denotes a hydrogen atom or an alkyl or aryl radical whose carbon chain or ring is interrupted by one or more hetero atoms, and R' denotes a hydrogen atom or an alkyl radical. Methylol compounds of this type are for example dimethylolurea, dimethyldimethylolurea, dimethyloldicyano diamide, methylolthiourea, dimethylolguanidine, trimethylolmelamine, triphenyltrimethylolmelamine and diphenyldimethylolurea. Methylol derivatives of monoureines, diureines, carboxylic amides, carboxylic diamides, urethanes and polyurethanes, for example butanedioldiurethane, the methylol derivatives of triazones, lactams, polyamides and ethyleneurea are moreover also suitable.

We understand by precursors of aminoplast-forming substances, compounds containing in the molecule at least one group having the formula:

$$-\underset{\underset{X}{\|}}{C}-\underset{\underset{R^4}{|}}{NH}$$

in which X and $R^4$ have the meanings given above. The aminoplast-forming substances are formed from these substances in the presence of the aldehydes or compounds splitting off formaldehyde.

Dyes which contain N-methylol groups or N-methylol ether groups or groups convertible into the same are particularly suitable for dyeing with the curable aminoplast-forming substances.

The following are examples of diazo components for such dyes:

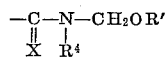

and

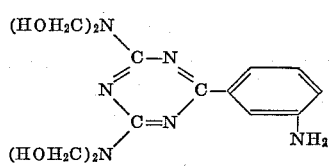

Examples of coupling components for the production of the new dyes are: 1-methylindole, 1-phenylindole, 1-ethyl-2-methyl-5-chloroindole, 1,2 - dimethylindole-3-carboxylic acid, 5 - acetyl - 1,2 - dimethylindole, 1,2-dimethylindole, 1 - ethyl - 2 - methylindole, 1 - vinyl-2-methylindole, 1 - cyanoethyl - 2 - methylindole, 1-cyanoethyl - 2 - phenylindole, 2 - methylindole - 1-propionic acid, 2 - phenylindole - 1 - propionic acid, 2-methylindole - 1 - propionamide, 2 - phenylindole - 1-propionamide, 1 - methyl - 2 - phenylindole, 1 - methyl-2 - phenylindole - 5 - sulfonic acid, 1 - methyl - 2-phenyl-5 - chloroindole, 1 - (3 - amino)-propyl - 2 - phenylindole, 1 - [3 - (2 - chloropropionylamino) - propyl] - 2 - phenylindole, 1-methylindole-5-sulfonamide,

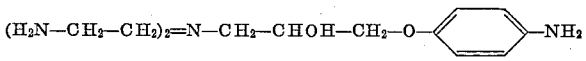

1 - benzyl - 4 - methoxyindole, 1 - benzyl - 2 - methyl-5 - methoxyindole, 1 - benzyl - 2 - methyl - 5 - methoxyindole - 3 - carboxylic acid, 1 - phenyl - 2 - methylindole-5 - oxyacetic acid - 3 - carboxylic acid, 1 - methyl - 5-bromoindole, 1 - methyl - 5 - aminoindole and 1 - methyl-5-thiocyanoindole.

Suitable diazo compounds for the process according to this invention are diazotized aromatic-isocyclic amines or aromatic-heterocyclic amines. Diazo compounds of aromatic-isocyclic amines may be derived for example from the benzene, diphenyl, stilbene and naphthalene series. Diazotized aromatic-heterocyclic amines may have for example the heterocyclic system of pyrrole, pyrazole, imidazole, thiazole, triazole, tetrazole or thiadiazole which may bear anellated rings. The diazo components may contain substituents usual in azo chemistry, such as halogen atoms, alkyl, aralkyl, cycloalkyl, aryl, hydroxyalkyl, haloalkyl, sulfonic acid, sulfonamide, nitro, carboxyl, carboxylic amide or carboxylic ester groups. Further suitable diazo components are monoazo or disazo dyes which contain at least one diazotizable amino group.

Diazotization and coupling take place in the conventional way in weakly acid to neutral medium with the addition of acid-binding agents in aqueous solution or suspension or in admixture with organic solvents. The last-mentioned method is recommendable where the coupling component does not contain water-solubilizing substituents. Particularly valuable dyes according to the invention are those having the abovementioned general formula in which X denotes a sulfonic acid group, $n$ is one of the numbers 1, 2 and 3, $m$ is one of the numbers 1 and 2 and in which the indole radical is substituted in 1-position or 2-position.

The dyes obtained according to the said process are suitable for dyeing and printing a great variety of materials, such as wool, silk or polyamide fibers, but particularly cellulosic materials, both synthetic fibers, for example of regenerated cellulose, and natural materials, such as cellulose, linen and especially cotton. Dyeings and prints of outstanding wet fastness are obtained on these fibers, advantageously with the addition of acid-binding agents, at room temperature or elevated temperature.

The invention is further illustrated by the following examples in which parts and percentages are by weight unless otherwise specified. Parts by volume bear the same relation to parts by weight as the liter (S.T.P.) to the kilogram.

Example 1

15.5 parts of the compound having the formula:

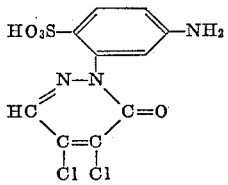

is stirred with 250 parts of water. After 15 parts by volume of concentrated hydrochloric acid has been added, 15 parts by volume of 23% aqueous sodium nitrite solution is added at 0° to 5° C. and the mixture is stirred at the same temperature for another thirty hours. A solution of 15 parts of 1-methyl-2-phenylindole-5-sulfonic acid in 250 parts by volume of 1% caustic soda solution is then allowed to flow in and the whole adjusted to pH 6 with 50% sodium acetate solution. When coupling is completed, the dye obtained is filtered off with suction, washed with dilute sodium chloride solution and dried in vacuo at 50° C. A yellow powder is obtained which dissolves in water with a yellow color. If the solution of the dye with the addition of caustic soda solution and sodium sulfate is padded onto cotton cloth and the cloth stored at room temperature, outstandingly wet fast yellow dyeings are obtained after conventional washing.

Example 2

15 parts of 23% sodium nitrite solution is added in one batch at 0° to 5° C. to a mixture of 20 parts of a compound having the formula:

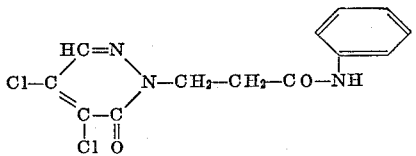

250 parts of water and 15 parts of concentrated hydrochloric acid, and the resultant diazo compound is coupled with 15 parts of 1-methyl-2-phenylindole-5-sulfonic acid as described in Example 1. After the coupling is completed, the dye is isolated and dried. It is a yellow, water-soluble powder which when dissolved in water containing acid-binding agents gives dyeings in yellow shades having very good wet fastness on regenerated cellulose fibers.

By using as the diazo component 21 parts of a compound having the formula:

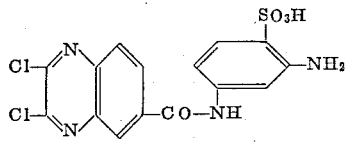

or 19 parts of a compaund having the formula:

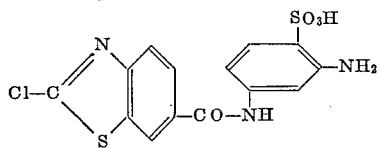

dyes are obtained which give yellow dyeings having similar properties on cloth of natural or regenerated cellulose fibers.

Example 3

14 parts of 5-(2-chloropropionylamino)-1-aminobenzene-2-sulfonic acid is diazotized in the way described in Example 2 and the diazo compound is coupled as in Example 1 with 15 parts of 1-methyl-2-phenylindole-5-sulfonic acid.

Deposition of the dye formed is completed by adding 500 parts by volume of saturated sodium chloride solution. The isolated and dried product is a yellow, readily water-soluble powder which with the addition of alkali gives very wet fast yellow prints on cotton.

Example 4

15 parts of the aminobenzene derivative having the formula:

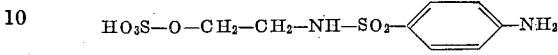

is stirred with 150 parts of water. After 15 parts of concentrated hydrochloric acid has been added, 15 parts of 23% sodium nitrite solution is allowed to flow in gradually at 0° to 5° C. and the diazo compound thus obtained is reacted with 15 parts of 1-methyl-2-phenylindole-5-sulfonic acid as described in Example 1.

The dye is completely precipitated by adding 250 parts of alkaline potassium chloride solution and then filtered off with suction and dried. The product obtained is readily soluble in water. When padded onto cotton and fixed in the presence of acid-binding agents, it gives outstandingly wet fast dyeings in yellow shades.

By using the equivalent amount of 2-phenylindole-1-propionic acid instead of 1-methyl-2-phenylindole-5-sulfonic acid, a dye having similar tinctorial properties is obtained.

By using as the diazo component 14 parts of a compound having the formula:

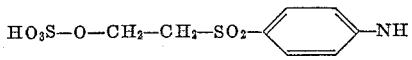

yellow dyes are again obtained with 1-methyl-2-phenylindole-5-sulfonic acid or 2-phenylindole-1-propionic acid; the dyes have similar tinctorial properties.

Example 5

8 parts of 3-acryloylamino-1-aminobenzene is stirred with 250 parts of water and 15 parts by volume of concentrated hydrochloric acid is added to the suspension cooled to 0° to 5° C. Stirring is continued until complete solution has taken place. 15 parts by volume of 23% sodium nitrite solution is then added in one portion and the resultant diazo solution is coupled with a solution of 15 parts of 1-methyl-2-phenylindole-5-sulfonic acid as described in Example 1. The isolated and dried dye, which is a yellow powder, gives yellow prints and dyeings having very good wet fastness on cotton or rayon staple fiber.

By using 10.7 parts of 2,3-dichloro-6-aminoquinoxaline or 9.2 parts of 2-chloro-6-aminobenzothiazole instead of 8 parts of 3-acryloylamino-1-aminobenzene, yellow dyes are obtained which give prints or dyeings having similar fastness on cotton.

Example 6

The diazo compound obtained from 13 parts of the sulfuric acid ester having the formula:

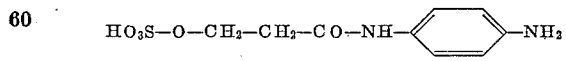

by the process of Example 5 is coupled as described in Example 1 with 15 parts of 1-methyl-2-phenylindole-5-sulfonic acid to form the dye. 200 parts of sodium chloride is added and the dye isolated and dried at 40° C. in vacuo. A yellow powder is obtained which dyes cotton, with an addition of alkali, very wet fast yellow shades.

Example 7

13 parts of the hydrochloride of an amine of the formula:

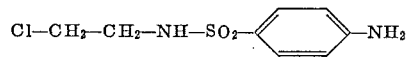

is diazotized in the usual way and the diazo compound is coupled with 15 parts of 1-methyl-2-phenylindole-5-sulfonic acid as described in Example 1. The isolated and dried dye, which is a yellow powder, dyes cotton outstandingly wet fast yellow shades in the presence of acid-binding agents.

*Example 8*

10.5 parts of the compound having the formula:

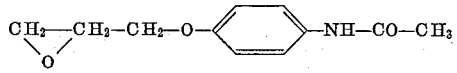

is boiled with 75 parts by volume of 5 N hydrochloric acid for two hours under reflux. After cooling, 150 parts of ice and 15 parts by volume of 23% sodium nitrite solution are added and the diazo compound thus obtained is coupled with 15 parts of 1-methyl-2-phenyl-indole-5-sulfonic acid as described in Example 1. The isolated and dried dye gives yellow dyeings of very good wet fastness with an addition of alkali.

*Example 9*

A solution of 11.5 parts of 5-acetylamino-1-aminobenzene-2-sulfonic acid in 50 parts of 4% caustic soda which has been prepared cold has added to it 15 parts by volume of 23% sodium nitrite solution and the whole is allowed to flow at 0° to 5° C. into a mixture of 50 parts of water, 100 parts of ice and 15 parts by volume of concentrated hydrochloric acid. The diazo compound thus obtained is coupled with 15 parts of 1-methyl-2-phenyl-indole-5-sulfonic acid as described in Example 1. The dye formed is filtered off with suction. The paste obtained is boiled under reflux in a mixture of 250 parts of water and 13 parts of 50% caustic soda solution until complete deacetylation has taken place. This saponification may readily be followed by paper chromatography.

The dye solution is then saturated with carbon dioxide at 0° C. to 5° C. and then a suspension of 20 parts of 4-(dichlorotriazinyl)-aminobenzene sulfonic acid in 500 parts of water is added at room temperature. The mixture is stirred for several hours at room temperature, until initial dye cannot be detected. The reaction product is isolated by dilution with 5000 parts of water, addition of 500 parts by volume of saturated sodium chloride solution, filtration with suction and drying at 40° C.

in vacuo. An aqueous solution of the dye to which sodium carbonate and urea have been added is padded onto cotton. The dye is fixed at 130° C. and any dye not fixed is removed. Yellow dyeings having outstanding wet fastness are obtained.

*Example 10*

A solution of 10 parts of cyanuric chloride in 100 parts by volume of acetone is allowed to flow into a mixture of 500 parts of ice and 1000 parts of water and then the solution of the deacetylated dye obtained according to paragraph 1 of Example 9 and saturated with carbon dioxide is gradually added. When the reaction is over, 100 parts of saturated sodium chloride solution is added and the reaction product isolated by filtration with suction. The yellow powder obtained by drying under subatmospheric pressure at 40° C. gives a yellow aqueous solution which, in the presence of an acid-binding agent, dyes regenerated cellulose cloth in yellow shades having very good wet fastness.

*Example 11*

The diazo compound obtained from 15 parts of 2-aminonaphthalene-4,8-disulfonic acid by reverse diazotization is coupled with a solution of 14 parts of 1-aminopropyl-2-phenylindole (obtained by catalytic hydrogenation of 1-cyanoethyl-2-phenylindole) in 1000 parts of 0.5% acetic acid with an addition of 1000 parts of ice and 100 parts of 50% sodium acetate solution. The dye formed is precipitated by adding 100 parts of concentrated hydrochloric acid and filtered off with suction.

The paste obtained is dissolved in 1000 parts of 1% sodium carbonate solution and a suspension of 20 parts of 4-(dichlorotriazinyl)-aminobenzenesulfonic acid is added at room temperature. The pH value is kept at 8 to 9 by continual addition of 10% sodium carbonate solution. The dye is precipitated by adding 200 parts of potassium chloride and the product filtered off with suction and dried under mild conditions.

When used with an addition of alkali for dyeing cotton, yellow dyeings having outstanding wet fastness are obtained.

The following azo dyes, prepared analogously and reacted with the same cyanuric chloride derivative in the manner described, give the shades indicated when used for dyeing cotton.

| Structure | Shade of dyeing on cotton |
|---|---|
| (dye 1) | Yellow. |
| (dye 2) | Do. |
| (dye 3) | Orange. |

Example 12

The diazo compound prepared according to Example 9, paragraph 1, by reverse diazotization of 11.5 parts of 5-acetylamino-1-aminobenzene-5-sulfonic acid is coupled while cooling with a solution of 11 parts of 1-methyl-2-phenylindole in 250 parts of dimethylformamide with an addition of 25 parts by volume of 50% sodium acetate solution. A yellow dye is obtained which is completely precipitated by adding 50 parts by volume of concentrated hydrochloric acid. The dye is obtained as a paste by filtration with suction and washing. This paste is deacetylated by boiling with caustic soda solution as in Example 9, then saturated with carbon dioxide and reacted with 10 parts of cyanuric chloride as described in Example 10.

The isolated dye, which after drying is a yellow powder, is dissolved in water and dyes cotton yellow shades having very good wet fastness.

A dye having similar properties is obtained by using the condensation product of 1 mole of cyanuric chloride and 1 mole of 4-aminobenzenesulfonic acid for coupling with the dye as described in Example 9 instead of cyanuric chloride.

Example 13

The diazo compound obtained from 15 parts of the compound having the formula:

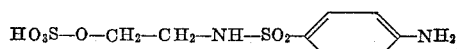

by the method described in Example 4 is coupled with 12 parts of a finely divided suspension of 12 parts of 1-methyl-2-phenylindole in 250 parts of water with an addition of 250 parts of ice and 100 parts by volume of 50% sodium acetate solution. The dye formed is filtered off with suction, washed with a little water and dried under subatmospheric pressure at 40° C. It dyes cotton in the presence of alkali in yellow shades having outstanding fastness.

By using equimolar amounts of 1-cyanoethyl-2-phenylindole or 2-phenylindole-1-propionamide as coupling components instead of 1-methyl-2-phenylindole, dyes having similar properties are obtained.

Example 14

The diazo compound of 15 parts of the compound having the formula:

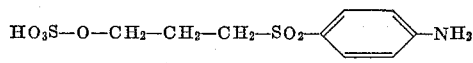

is coupled with a solution of 11 parts of 1-aminonaphthalene-6-sulfonic acid in 250 parts of 1% caustic soda solution with an addition of 50 parts by volume of 50% sodium acetate solution. After coupling is completed, the aminoazo dye is precipitated by adding 150 parts of potassium chloride, filtered off with suction and washed with dilute potassium chloride solution. The paste is dissolved in 500 parts of water, 15 parts of 23% sodium nitrite solution added to the solution which is then allowed to flow into a mixture of 100 parts of water, 200 parts of ice and 15 parts of concentrated hydrochloric acid. The diazo compound of the aminoazo dye thus obtained is coupled with 15 parts of 1-methyl-2-phenylindole-5-sulfonic acid as described in Example 1. The disazo dye is deposited by adding 3000 parts of saturated potassium chloride solution, isolated and dried in the usual way. A dark colored powder is thus obtained which dissolves readily in water with a bluish red color and dyes cotton cloth with an addition of alkali in claret shades having very good wet fastness.

Example 15

8 parts of 3-acryloylaminoaniline diazotized as in Example 5 is used in the procedure of Example 14 as the first diazo component. A disazo dye having similar tinctorial properties is obtained which also gives claret dyeings.

Example 16

The diazo compound obtained from 15 parts of 2-aminonaphthalene-4,8-disulfonic acid by reverse diazotization is added to a solution of 8 parts of 3-acryloylamino-1-aminobenzene in 150 parts by volume of 1 N hydrochloric acid with an addition of 100 parts by volume of 50% sodium acetate solution and 200 parts of ice.

The monoazo dye isolated by suction filtration is stirred with 250 parts of water and adjusted to pH 7 with dilute caustic soda solution. 15 parts of 23% sodium nitrite solution is added to this solution, the whole filtered and the solution allowed to flow gradually into a mixture of 15 parts of concentrated hydrochloric acid, 100 parts of ice and 100 parts of water. The diazo compound of the aminoazo dye thus obtained is coupled within 15 parts of 1-methyl-2-phenylindole-5-sulfonic acid as described in Example 1. The dye is precipitated by adding 750 parts by volume of saturated sodium chloride solution, isolated and dried in the usual way. The product is a dark red powder which when dissolved in water and padded onto cotton gives fast red brown dyeings after fixing.

Example 17

The diazo compound of the aminoazo dye obtained as described in Example 16 is added to a solution of 11 parts of 1-methyl-2-phenylindole in 250 parts of dimethylformamide. A brown coupling product is obtained which is precipitated by successive addition of 5000 parts of water and 3000 parts by volume of saturated sodium chloride solution, filtered off with suction and dried. With an addition of an acid-binding agent, it dyes cotton fast brown shades.

Example 18

The diazo compound obtained by reverse diazotization of 9 parts of 1-aminobenzene-4-sulfonic acid is coupled as described in Example 16 with 8 parts of 3-acryloylamino-1-aminobenzene, the resultant aminoazo dye is diazotized as described in Example 16 and the diazo compound coupled with a solution of 15 parts of 1-methyl-2-phenylindole-5-sulfonic acid. Separation of the dye is completed by adding 1000 parts by volume of saturated sodium chloride solution. The brown powder obtained by suction filtration and drying gives brown shades having very good wet fastness on cotton with an addition of alkali.

The dyes in the following table, all of which give brown dyeings on cotton, are obtained in an analogous way:

| Diazo components | Coupling components |
|---|---|
| $HO_3S-\langle\rangle-N=N-\langle\rangle(SO_3H)-NH_2$ with $NH-CO-CH_2-CH_2-Cl$ | 1-methyl-2-phenylindole |

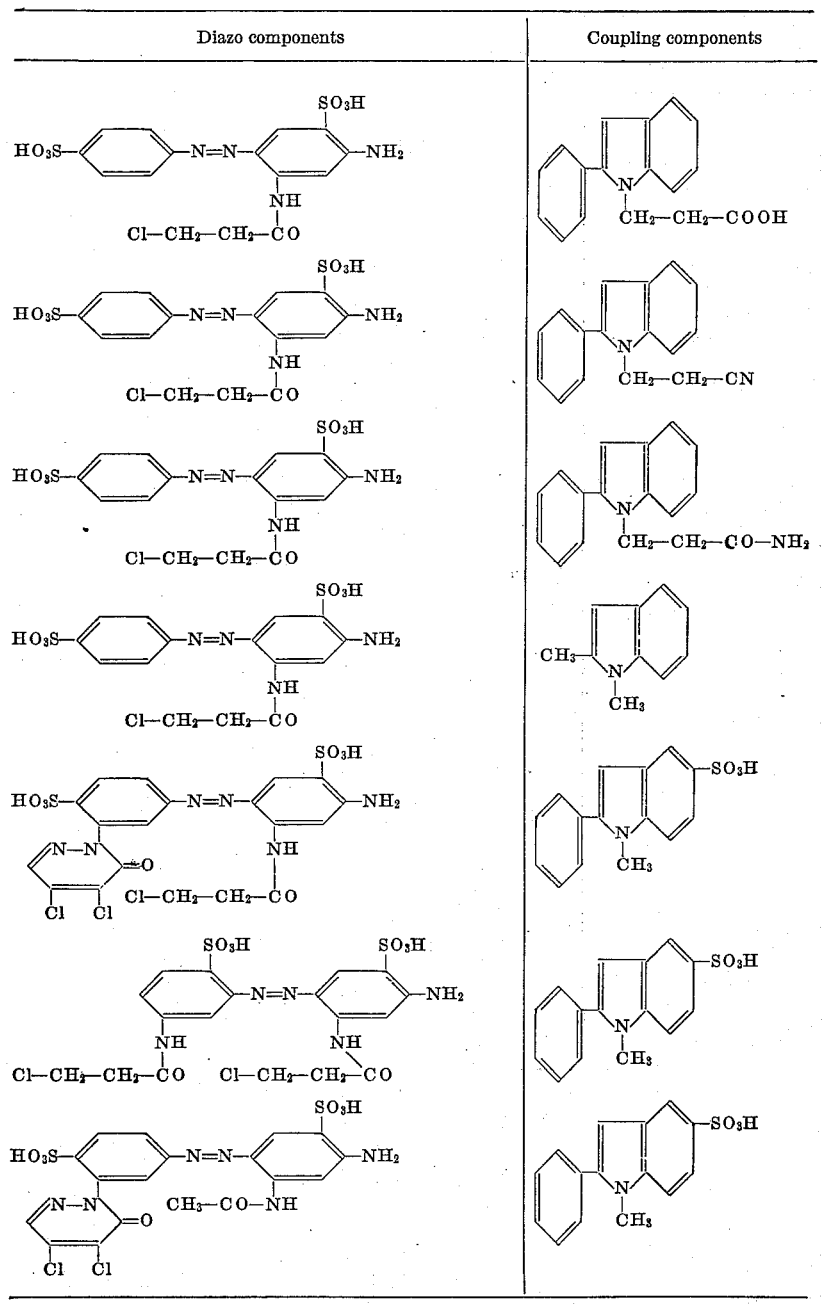

*Example 19*

20 parts of the sodium salt of the coupling product prepared according to Example 11, 30 parts of sodium bicarbonate, 15 parts of hexahydro-1,3,5-triacryloyl-s-triazine, 3 parts of polyvinyl alcohol and 12 parts of the condensation product of formaldehyde and naphthalene-2-sulfonic acid are mixed with 100 parts of urea, 420 parts of water and 400 parts of sodium alginate thickening containing 40 parts of dry substance in 1000 parts. Cotton cloth is printed with the printing paste thus obtained, dried and then steamed for about five to eight minutes at 100° C. The printed material is rinsed and soaped as usual. Yellow prints having very good wet fastnes properties are obtained.

By adopting an analogous procedure with the following dyes, prints having similar properties are obtained in the shades indicated:

| | Color of print on cotton |
|---|---|
| 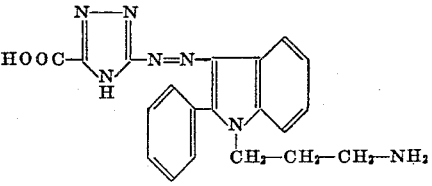 | Yellow. |
| 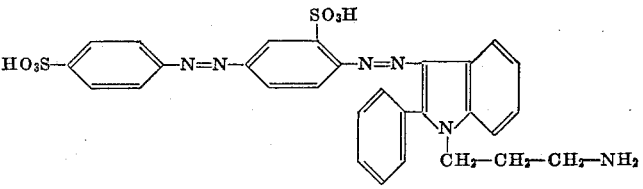 | Orange. |
| 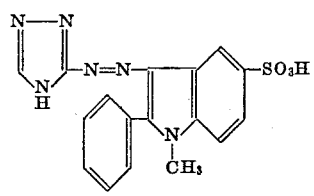 | Yellow. |
| 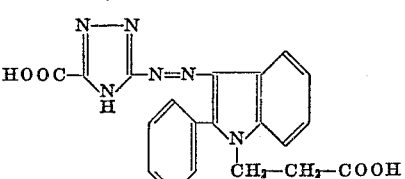 | Do. |
| 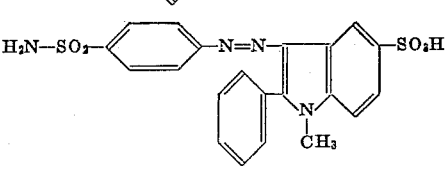 | Do. |

Example 20

Cotton cloth is padded with a solution containing per 1000 parts by volume 20 parts of the dye obtained according to Example 10, 200 parts of urea, 20 parts of Glauber's salt and 30 parts by volume of 32% caustic soda solution. The fabric is squeezed out to a moisture content of 80%, stored at 20° C. for forty-eight hours and then soaped at the boil.

Dyeings are obtained in yellow shades which have very good wet and light fastness.

We claim:

1. A dye of the formula:

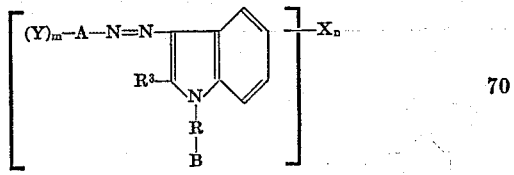

where
A denotes a diazo component selected from the class consisting of the benzene, phenylazobenzene and triazole series,
R represents a low molecular weight alkylene group,
B represents a group selected from the class consisting of hydrogen, cyano, carbamoyl, carboxy and amino and
$R^3$ denotes a group selected from the class consisting of phenyl and low molecular weight alkyl,
X represents a group selected from the class consisting of a sulfonic acid and a carboxylic acid group,
Y represents a group selected from the class consisting of 4,5-dichloropyridazonyl-, 4,5-dichloropyridazonyl-β-propionylamino, 2 - chloropropionylamino, 2 - sulfatopropionylamino, 2-chloroethylaminosulfonyl, 2-sulfatoethylaminosulfonyl, 2-sulfatoethylsulfonyl, 2-epoxypropoxy, 2,4-dichlorotriazinylamino, 2-chloro-4-(4-sulfophenylamino)-triazinyl - 6 - amino, 2,3-dichloroquinoxalinyl carbamoyl and 2-chlorobenzthiazolyl carbamoyl, and wherein the molecule contains at least one active hydrogen atom attached to a nitrogen atom when the molecule is free from groups Y,
n represents one of the integers 1 to 3 and
m represents one of the integers 0 to 2.

2. The dye of the formula:
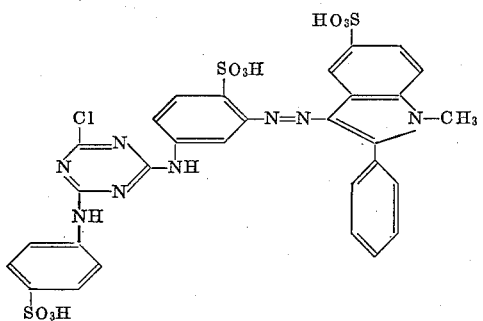
3. The dye of the formula:
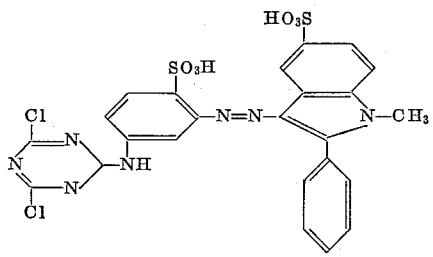
4. The dye of the formula:
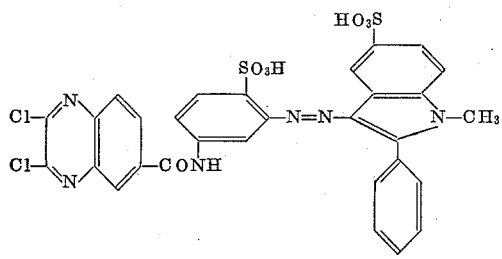
5. The dye of the formula:
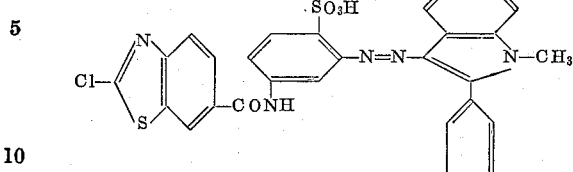
6. The dye of the formula:
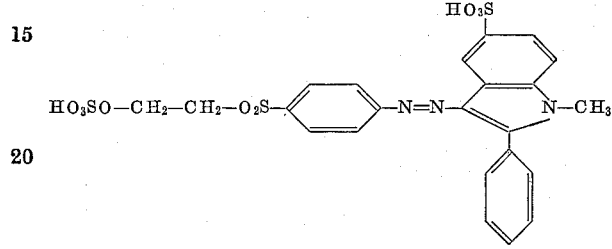
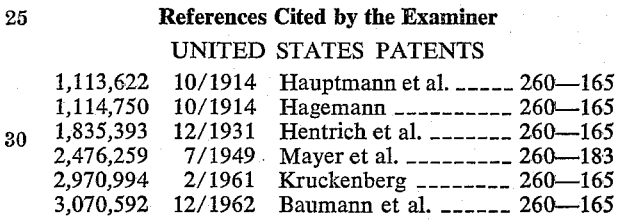
References Cited by the Examiner
UNITED STATES PATENTS
| | | |
|---|---|---|
| 1,113,622 | 10/1914 | Hauptmann et al. _____ 260—165 |
| 1,114,750 | 10/1914 | Hagemann _____ 260—165 |
| 1,835,393 | 12/1931 | Hentrich et al. _____ 260—165 |
| 2,476,259 | 7/1949 | Mayer et al. _____ 260—183 |
| 2,970,994 | 2/1961 | Kruckenberg _____ 260—165 |
| 3,070,592 | 12/1962 | Baumann et al. _____ 260—165 |
CHARLES B. PARKER, *Primary Examiner.*
REYNOLD J. FINNEGAN, DONALD M. PAPUGA,
*Assistant Examiners.*